United States Patent [19]

Hawkins et al.

[11] 4,362,352

[45] Dec. 7, 1982

[54] SPLICING DEVICE

[75] Inventors: Ronald G. Hawkins; Dwain L. DeHart, both of Massena, N.Y.

[73] Assignee: Aluminum Company of America, Pittsburgh, Pa.

[21] Appl. No.: 147,561

[22] Filed: May 8, 1980

[51] Int. Cl.³ .............................................. H01R 7/06
[52] U.S. Cl. ............................ 339/248 S; 339/249 R; 339/273 R; 339/273 S; 174/90; 174/94 R; 174/94 S
[58] Field of Search ................ 339/248 S, 249 R, 273; 174/90, 94 RS

[56] References Cited

U.S. PATENT DOCUMENTS

| | | | |
|---|---|---|---|
| 1,854,783 | 4/1932 | Cook | 339/273 S |
| 2,077,737 | 4/1937 | Brandt | 174/84.5 |
| 2,148,173 | 2/1939 | Rogoff | 339/273 S |
| 2,161,694 | 6/1939 | Becker | 339/273 S |
| 2,554,387 | 5/1951 | Saul | 339/273 S |
| 2,988,727 | 6/1961 | Berndt | 339/273 S |

Primary Examiner—Donald R. Schran
Attorney, Agent, or Firm—Elroy Strickland

[57] ABSTRACT

An assembly for making a mechanical or electrical connection between a conductor and the like and another element. The assembly comprises a tubular housing having a tapered portion converging toward an open end of the housing, the housing containing a unitary, tubular, conductor gripping member. The conductor gripping member has an outer tapered surface converging toward one of its ends and toward the open end of the housing. At least one coil spring made of relatively large gauge spring material is held in compression within the housing and in a manner that will drive the conductor gripping member toward the open end of the housing with substantial force when the compression of the spring is released. The tapered end of the housing is then effective to collapse the gripping member on a conductor or cable inserted in the housing and into the member.

6 Claims, 10 Drawing Figures

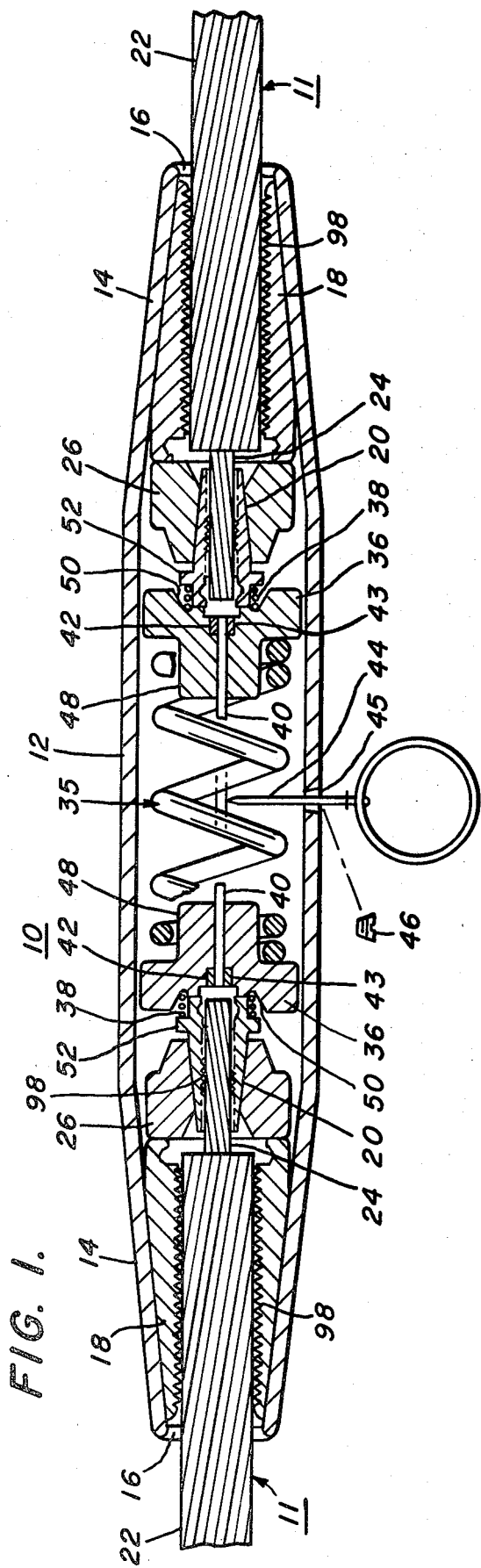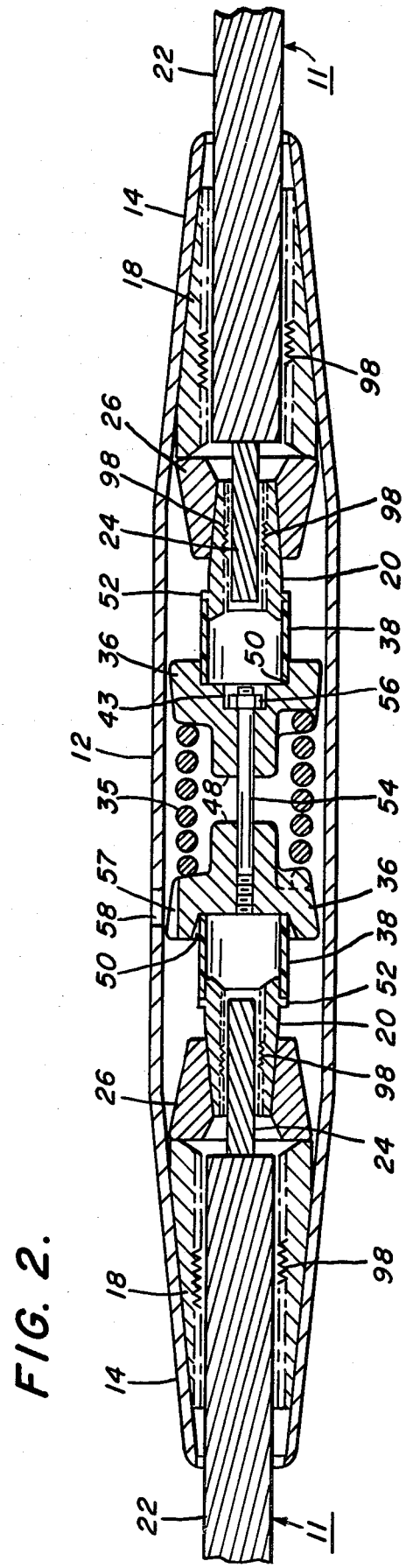

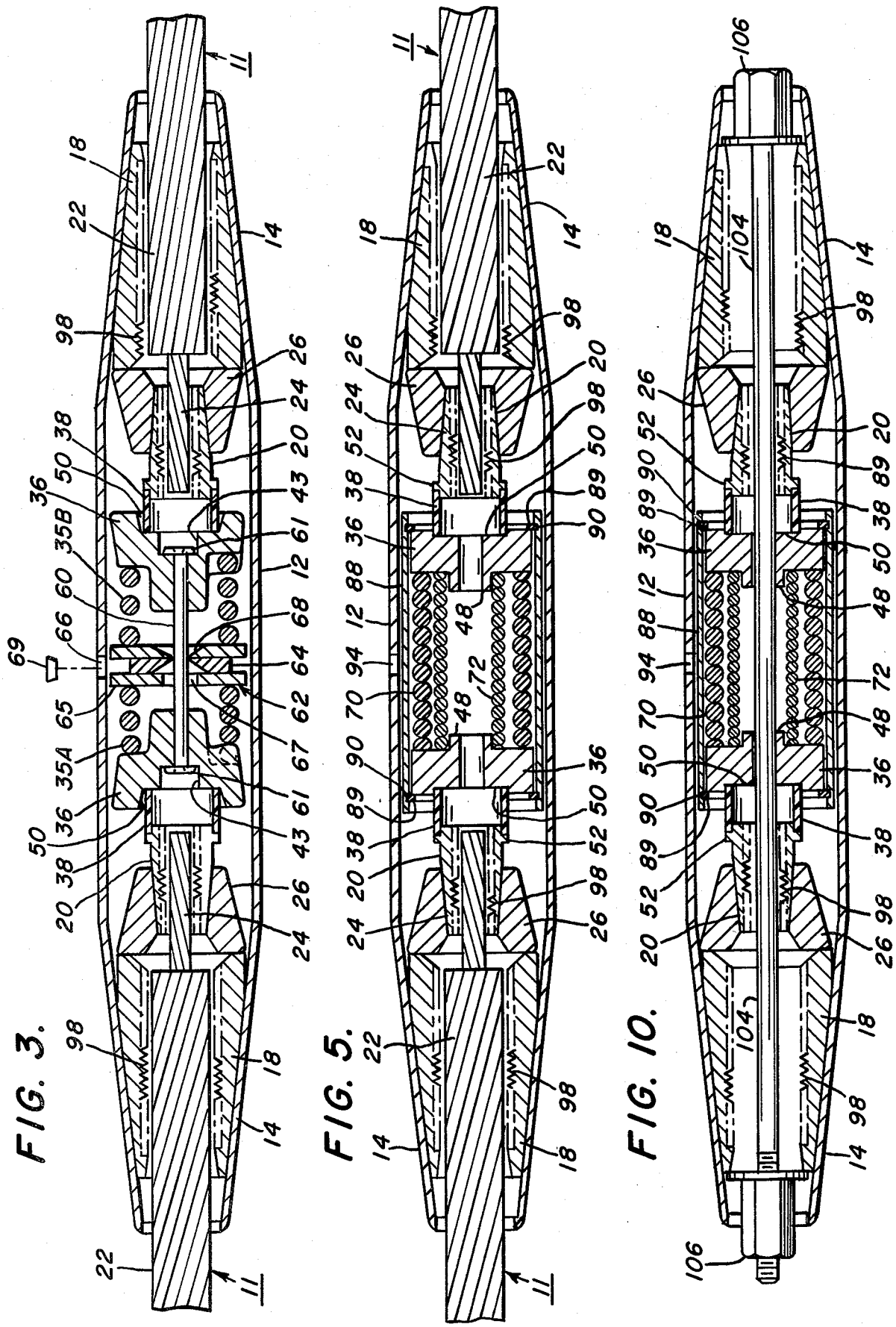

SPLICING DEVICE

BACKGROUND OF THE INVENTION

The present invention relates generally to a conductor and cable splicing device and particularly to a novel structure and method of effecting the splice.

The amount of patent art in the area of conductor and cable splicing is substantial. To discuss all of this art here would be cumbersome and, in addition, unnecessary, as the art tends to divide into two basic categories, namely, compression connectors and tension connectors. Compression connectors involve the compression of an outside tubular member upon multiple jaw elements located in the tubular member to grip a cable or conductor inserted into the tubular member and between the jaws. The compression of the tubular member on the jaw elements is effective to close the jaws upon the conductor or cable inserted between the jaws. Examples of this type of connector are U.S. Pat. Nos. 3,384,704 and 3,996,417 to Vockroth and Annas, respectively.

The tension type of cable splicing device involves the use of multiple jaw segments laterally translated against a tapered surface such that the jaw segments are compressed upon a conductor or cable inserted between the segments. Examples of this type of device are the disclosures of U.S. Pat. No. 3,515,794 to Beinhaur et al and U.S. Pat. No. 3,681,512 to Werner et al. In this type of splice the tension of a suspended cable functions to hold the jaw segments in the tapered end of a housing to insure and maintain a compressive, gripping force of the jaw segments on the conductor located between the segments. Explosive charges are employed in these two devices to effect displacement of the jaw segments in the process of gripping the conductor.

Typical of another type of tension device is that shown in U.S. Pat. No. 2,138,913 to Fotsch in which a soft, relatively light gauge spring is employed to urge wedge segments into the opposed ends of a tapered housing. Again, however, gripping force is provided by the tension of two suspended cables spliced together by the device. The cables are conveniently released from the device by simply compressing the spring.

As is seen further from the patent art existing in this area, multiple jaw segments require spreaders and retention means to maintain the jaw segments in place for insertion of the conductor end to be gripped.

BRIEF SUMMARY OF THE INVENTION

The present invention is directed to the type of connecting device or splice requiring a tapered housing, but is of such a nature that the device does not require the suspended tension of the conductor to maintain and insure a good electrical and mechanical connection. Hence, the splice of the invention is suitable for a buried or underground use, as well as overhead suspension, it being appreciated that a cable lying at rest in the ground provides no tension resulting from the suspended mass of the cable.

More particularly, the splice of the present invention employs the well-known outer housing that has a tapered portion converging to an open end. Inside the housing, however, is a one-piece member (as opposed to a plurality of jaw segments) for gripping a conductor inserted into the housing and into the member, the gripping member also having a tapered outer surface similar to the tapered inside surface of the housing, such that when the member is driven toward the open end of the housing the diameter thereof is reduced and the gripping surfaces of the member forced upon a conductor inserted therein to grip the same. The gripping member is driven forward into gripping relationship with the conductor by the release of a compressed coil spring made of a relatively large gauge spring material. The length of the spring in an "at rest" position is considerably larger than the distance the spring travels in driving the gripping member into gripping relationship with the conductor. The spring is held in compression by a cord or rod connected to a hammer-like structure located adjacent at least one end of the cord or rod and disposed in engagement with one end of the spring to hold the same in compression. The spring can be released by a variety of means, as explained hereinafter. When the spring is released, it drives the hammer against the rear of the cable gripping member with substantial force such that the gripping member is driven toward the end of the tapered housing. In moving into the taper of the housing, the gripping member is reduced in diameter onto the end of the cable to grip the same.

Several advantages flow from the use of the large impact spring of the invention. For example, no explosive substances are required such that the splicing device of the invention is safe to use, and large quantities of the device can be stored and/or transported without hazard. Further, the compressive force of the spring is constant, with no other variables affecting the force at which the spring maintains the gripping member in physical contact with the cable or cables being gripped. In addition, since the coil spring is longer than its released position within the splicing device, the remaining force of the spring counters conditions of creep within the device, as can occur with changes in temperature caused by changes in line current and voltage and/or changes in ambient temperature. Good electrical connection is maintained after the mechanical action of the components, under impact of the spring, removes oxides from the contacting and connecting surfaces.

The conductor gripping member of the invention is a unitary tubular structure having weakened wall portions that hold gripping portions of the member in place to receive the conductor to be spliced, yet allow the member and gripping portions to collapse on the conductor when the member is squeezed inwardly by the converging end of the tubular housing.

Such a unitary structure has several advantages over the multiple jaw segments of the above art, not the least of which is the substantial reduction in the cost of making the member over that of jaw segments, i.e. such a member can be made by a simple extrusion process, cut to the desired length, and then drilled and tapped to provide a circular, serrated inner surface for gripping the conductor. The outer surface of the member is machined quickly to provide a tapered surface compatible with the inside tapered surface of the housing. Further, such a member does not require the spacers and retainers that are necessary to hold jaw segments together and yet in an open position to receive the conductor to be spliced.

Segmented jaw structures of the existing art are expensive to make because they must be forged or investment cast, which involves costly tooling, and each set is limited to a relatively small number of cable sizes. As there are about 550 cable sizes in the industry that may at some time or another need splicing, it can be appreciated that a substantial capital investment is required to maintain a supply of such jaw segments, along with the costly tooling needed to make the jaws in the first place. A unitary structure has a greater range of conductor diameters it can effectively grip, in comparison to individual jaw segments, and is relatively inexpensive to make, as explained earlier.

THE DRAWINGS

The invention, along with its objectives and advantages, will best be understood by consideration of the following detailed description and the accompanying drawings in which:

FIG. 1 is a longitudinal section of the splicing device of the invention, including one embodiment of a release mechanism employable in the device;

FIG. 2 is a partial section of the device of FIG. 1, FIG. 2 showing a release mechanism different from that of FIG. 1;

FIG. 3 shows yet a third embodiment of a release mechanism of the invention;

FIGS. 4 and 5 show, respectively, two additional embodiments of the invention;

FIG. 10 is the splicing device of FIG. 5 provided with means for shipping the device.

PREFERRED EMBODIMENT OF THE INVENTION

Figure 4:
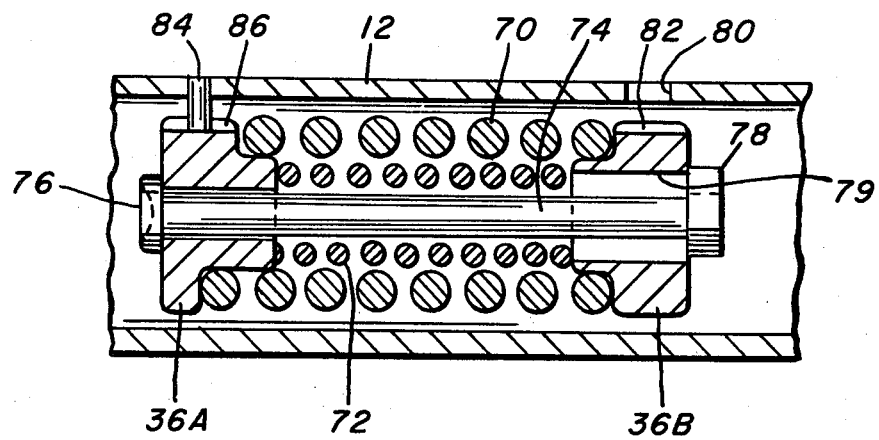

Referring now to the drawings, FIG. 1 thereof shows a device 10 for splicing and securing together the ends of two conductors 11 of the ACSR type, though the principles of the invention are applicable to securing other types of cables and conductors, and only one such cable or conductor in a dead-end arrangement. Device 10, as shown in FIG. 1, includes an outer tubular housing 12 having opposed tapered end portions 14 that gradually converge to opposed openings 16 that are smaller in diameter than the remainder of the tube.

Inside tube 12 are members 18 and 20 for gripping respectively the outside layer or layers of aluminum strands 22 of an ACSR conductor (11) and the inside steel core 24 of the conductor, the material of gripping members 18 and 20 being respectively similar to that portion of the conductor they engage in the gripping process. Members 18 and 20 are provided with outside tapered surfaces that serve, in respective cooperation with the inside taper of housing portions 14 and annular members or collars 26, to collapse the gripping members on the conductor when they are driven toward the ends of tube 12.

In accordance with the principles of the invention, the gripping members of splicing device 10 are driven into a tight, fixed gripping relationship with conductors 11 by the release of the compression of a massive open coil spring 35 (or springs in certain embodiments of the invention) located between two hammer-like structures 36 disposed immediately behind gripping members 20 and collars 26. Spring 35 is made of a heavy gauge spring material such that when its compression is released and the gripping members are driven into gripping relationship with the conductors by the released energy of the spring, the force of the gripping relationship is such that the splice effected thereby is secure for a variety of adverse conditions. As discussed earlier, the "at rest" length of the spring is substantially longer than the distance available for its travel in tube 12, and its large size is such that it is not easily compressed to effect release of the conductors. For example, under ice conditions, an overhead conductor can accumulate a jacket of ice of substantial weight. With warming conditions, however, the jacket does not always melt away slowly but rather will drop suddenly from the conductor, thereby suddenly releasing the conductor such that the conductor jumps upwardly to compress a splice in the conductor. With compression of a splice, an easily compressed spring of the splice will compress and release (and drop) the conductor. Hence, it is imperative that overhead splices that might be subjected to icing conditions be secure from such releasing action.

In underground use, there is no tension on spliced conductors to pull the gripping members of the splicing device into the tapered ends of the splice housing to maintain a good splice. Hence, again, under such "at rest" conditions, it is necessary to insure a fixed, tight grip in spliced conductors.

Spring (or springs) 35 (and springs 70 and 72 in FIGS. 4 and 5) in the present invention provides the above insurance in a manner presently to be described in detail.

In FIG. 1, spring 35 is shown in a released condition, with gripping members 18 and 20 driven into gripping relation with two conductors 11 inserted into housing portions 14 and into the gripping members. Initially, before assembling the device of the invention, one end of housing 12 is reduced in diameter to provide one of the tapered portions 14. A set of gripping members 18 and 20, with a collar 26 on 20, is inserted through the end of the housing that has not been reduced in diameter and then disposed in the tapered end. Next, a bushing 38 (FIGS. 2 and 5) is located behind (inwardly of) gripping member 20. Spring 35 is secured together between two hammers 36 in a compact, compressed unit (see FIGS. 2 to 5) by appropriate means described below, and inserted into the end of tubular structure 12 that has not been reduced in diameter. (The end that has not been reduced in diameter provides access to the structure.) Another set of gripping members 18 and 20, along with another collar 26 and bushing 38 are then disposed in the tubular structure in front of the associated hammer, as shown in the drawings. The unreduced end of the tubular structure is now reduced in diameter to provide the end with a converging, tapered end corresponding to the taper of associated gripping member 18 and the other end of the housing.

In FIG. 1, spring 35 is held in compression by cord means 40, made of a material of suitable quality and strength, secured to opposed hammers 36, such as by bushings 42 located in recesses 43 provided in the outward face and center of each hammer. (The cord is first disposed in a central opening in each bushing 42. The bushing is slightly larger than recess 43 such that the bushing is squeezed on the cord when it enters into the recess.) In FIG. 1, the cord has been severed by a blade device 44 inserted into tube 12 through an opening 45 provided in the tube. After the cord is cut by 44, 44 is removed from housing 12, and opening 45 is sealed closed by the insertion of an appropriate stopper 46. However, before stopper 46 is placed in opening 45, a grease material is preferably entered into housing 12 through 45 to fill the housing. Such filling protects the splice from the entry of water. If water is permitted to enter the housing, and then freezes, the housing may break, because of the force of expanding ice, and thereby release the cable ends by releasing the grip of the gripping members. In addition, the grease allows the use of less expensive materials in making the springs, hammers, etc. as the grease will protect them from rust and oxidation caused by the weather elements.

As seen in FIG. 1, the hammers 36 have moved against the ends of gripping members 20 to drive the same and gripping members 18 toward the open ends 16 of tube 12. The gripping members 18 collapse (in a manner explained below) on cable portion 22 by action of the tapered inside surfaces of 14 bearing on 18 as 18 moves into the tapered portions of 12. Similarly, collars 26, bearing on gripping members 20, collapse 20 on respective steel cores 24 as 20 moves into 26. Bushings 38, which space hammers 36 from gripping members 20, are made of a brittle plastic material that breaks and falls to the bottom of housing 12 when the hammers are driven toward gripping members 20 upon release of the compression of spring 35. While intact, bushings 38 limit the inward extent of conductor 11 in housing 12 when the conductor is inserted into the housing. If the conductor enters in too far, it must be driven back with the gripping jaws by spring 35 when the spring is released, thereby taking energy from the splicing function of the spring. Bushings 38 accomplish this by holding gripping members 20 and collars 26 a spaced distance from hammers 36 when the end of cable layer 22 abuts against 20 and 26, in the process of being inserted into the ends of housing 12, and allow a velocity buildup when spring 35 is released.

Still referring to spring 35, as depicted in FIGS. 1 to 5, it will be noted that hammers 36 have inwardly extending projections 48 that are located in the ends of spring 35 (spring 72 in FIG. 5), the cross-section of the projections corresponding to the inside diameter of the spring opening so as to hold the hammers in parallel alignment with housing 12 and maintain the same when the hammers are driven forward by the spring.

In a similar manner, with spring 35 held in compression, spacer bushings 38 are held in place by extending over the inward ends of gripping members 20 and in a recess 50 provided in each hammer, the recesses facing in an outwardly direction. An integral shoulder 52 provided on the periphery of each gripping member 20 prevents bushing 38 from traveling forward on gripping members 20.

FIG. 2 of the drawings shows in partial section the splicing device of the invention in which the release mechanism for spring 35 is a rod 54 threaded into one (the left-hand one in FIG. 2) of the hammers 36. The other end of rod 54 is secured to the other hammer by appropriate means, such as by a nut 56 threaded onto the end of the rod, as shown. To release spring 35, the threaded hammer is rotated, with a suitable tool (not shown) inserted through opening 58 provided in housing 12, and into slots 57 provided on the periphery of the hammer under 58, until the hammer and rod separate. Opening 58 is closed in the manner of FIG. 1, and the components within the housing of FIG. 2 are preferably sealed in grease, in the manner described earlier.

FIG. 3 of the drawings shows an embodiment of the invention in which two, end-to-end coil springs 35A and 35B, having the same length and spring coefficient, are located in housing 12 and held in compression by a rod 60 secured to hammers 36. Here, the ends of the rod can be provided with integral rivet-type heads 61 to secure the hammers against the springs, the rivet heads being located in the recesses 43 of the hammers. Located centrally of rod 60 and held between the inner ends of springs 35A and 35B in compression is means 62 for severing the rod when it is desired to splice together two conductors, such as conductors 11 in FIG. 1. 62 includes two blades 64 and 68 and a disc 65 disposed on and about the rod. Disc 65 has an opening 67 sized to permit 64 and 68 to travel through the rod. The material and cross-section of rod 60 are such that the rod is strong enough to hold springs 35A and 35B in compression, yet soft enough to allow blades 64 and 68 to sever the rod when the blades are driven against and through the rod. This is accomplished by inserting a tool (not shown) through opening 66 provided in housing 12, and driving the tool against the blades. After the splice is effected and the tool is removed from the housing, opening 66 is closed by an appropriate plug 69 after housing 12 is filled with grease.

The arrangement of FIG. 3 insures balanced driving and gripping force on the gripping member when rod 60 is severed, as springs 35A and 35B are of the same length, which locates the cutting device 62 centrally of the length of the retaining rod, and the two springs have the same coefficient of resilience.

FIG. 4 of the drawings shows in partial section a second double spring arrangement employed to effect a splice of two conductors (not shown in FIG. 4). Here, the two springs, springs 70 and 72, are located concentrically, one within the other. Such an arrangement provides a maximum amount of stored energy in a minimum amount of space, as compared to the end-to-end spring arrangement of FIG. 3.

The springs of FIG. 4 are held in compression by a rod 74 and two hammers 36A and 36B, as in the previous embodiments, with one end of the rod provided with a means (a rivet head 76 in FIG. 4) to engage the hammer on the left (36A) and an enlarged head 78 of a predetermined shape on the right engaging the hammer (36B) on the right. Extending completely through this hammer is an opening 79 having a configuration corresponding to the shape of head 78 but slightly larger than head 78, so that when the opening and head are relatively rotated to align the two, the head passes through opening 79 under the force of the compressed springs 70 and 72 to release the stored energy of the springs. The hammers are thereby driven home to effect connection of the two conductors (not shown) inserted into the ends (not shown in FIG. 4) of the housing of the device of FIG. 4. Alignment of head 78 and opening 79 can be effected by rotating the hammer, and this can be effected by appropriate motion of a tool, a screw driver, for example, inserted through an opening 80, provided in the housing, and into a slotted edge 82 of the hammer (36B) located in alignment with the opening. A pin 84 is disposed to engage the other hammer, 36A, as shown in FIG. 4, to prevent rotation of the hammer and rod when hammer 36B is rotated to release the springs. Hammer 36A is provided with a slot 86 that extends the length of the hammer portion engaging pin 84 to permit the hammer to travel forward and free of the pin when the springs are released.

Figure 6:
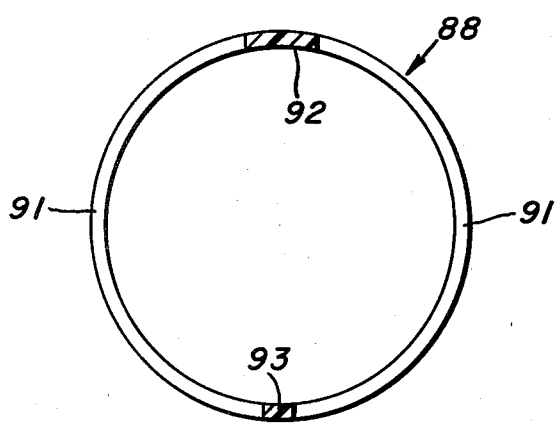
FIG. 6 is a cross-sectional view of a tube means employed in the embodiment of FIG. 5.

FIG. 5 shows yet another embodiment of the invention in which a tubular member 88 is disposed around and secured to the hammers 36. The tube and hammers can be secured together in a variety of ways, the structure depicted in FIG. 5 being given by way of example only. As shown, a washer-like structure 89 is held in a slot 90 provided in the inside surface of tube 88 adjacent each end of the tube. The central opening of the washers accommodates bushings 38 and secures the compression of main springs 70 and 72, as in FIG. 4, by engaging the outside faces of the hammers. Tube 88 is provided with opposed cuts 91 (FIG. 6) adjacent its longitudinal center in a manner that leaves two opposed sections 92 and 93 of the tube intact and uncut, as shown in FIG. 6. 92 is a relatively large section, while 93 is relatively small, for purposes presently to be explained. Housing 12 is then provided with an opening or slot 94 located opposite the larger uncut section 92. Slot 94 is dimensioned to receive a small circular saw blade or a drill bit (not shown) to cut through section 92, which then transfers the load of compressed springs 70 and 72 to small section 93. 93 gives way, which severs the tube in two and releases springs 70 and 72. The tensile strength of 93 is such that it cannot withstand the compressed force of 70 and 72.

Tube 88 is a rigid member that is effective to maintain the hammers in parallel alignment with tubular housing 12 when the springs are released and the hammers driven outwardly to effect the splice.

Figure 7:
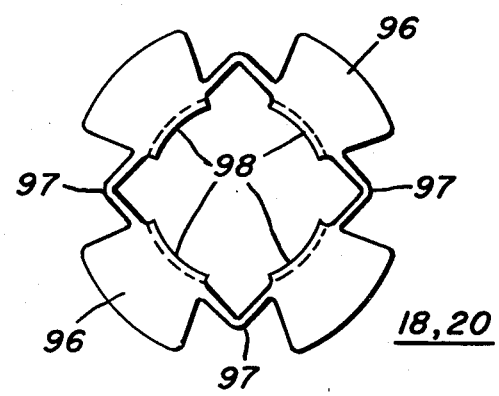
FIG. 7 is an end elevation view of a unitary means for gripping the end of a conductor inserted into the unitary means and into the splicing device of the invention.

FIG. 7 shows, in cross-section, an embodiment of a unitary gripping member (18 and 20) employable in the splicing device of the invention. Such a gripping member 20 would, of course, grip the steel core 24 of an ACSR conductor, such as 11 in FIG. 1, while 18 would grip aluminum strands 22. As shown in FIG. 7, four gripping portions or segments 96, spaced 90 degrees apart, are held together by four thin wall structures 97 extending between the segments and spaced 90 degrees apart. The thin walls are folded in an outward direction that permits easy collapse of the segments when they are driven against the tapered ends of housing 12 and the tapered surface of 26. As discussed earlier, several additional advantages flow from such a unitary structure, such as the ease at which they are manufactured and the savings effected by requiring a fewer number of gripping members for the large number of conductor sizes that may need splicing. Serrated surfaces 98 can be conveniently provided on the inside surface of 96 by simply tapping a central opening provided in an extruded structure, for example.

Figure 8:
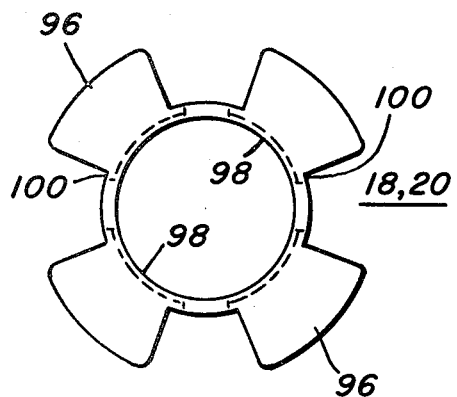
FIG. 8 is an end elevation view of a second unitary gripping means employable in the splicing device of the invention.
Figure 9:
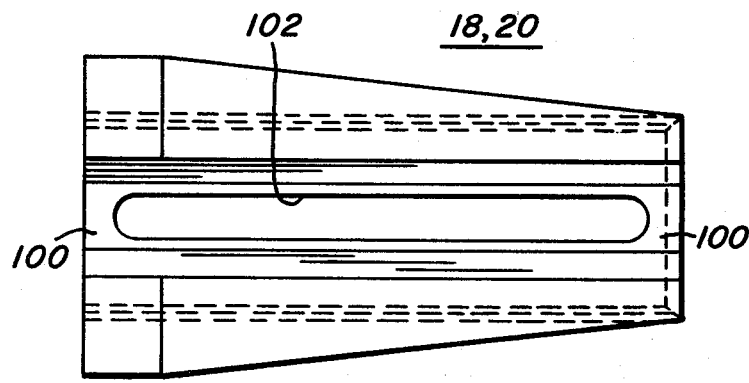
FIG. 9 is a side elevation view of the gripping means of FIG. 8.

A similar type unitary gripping member is shown in FIGS. 8 and 9 of the drawings, except that the gripping member in FIGS. 8 and 9 has circular thin wall portions 100 provided only adjacent the ends of the structure, as best seen in FIG. 9, and at 90 degrees apart, as best seen in FIG. 8. Between the thin wall portions, the material of the gripping member is removed to provide elongated open slots 102, only one of which is visible in FIG. 9. The thin wall portions 100 fold in the manner of the gripping member of FIG. 7 in the process of effecting a splice.

FIG. 10 of the drawings shows a means for shipping the splicing device of the invention. More particularly, a long tension rod 104 is shown inserted between the internal components of the device and secured at the ends of the device by two nuts 106 respectively threaded on the ends of the rod. The function of this arrangement and assembly is to prevent accidental release of the springs after assembly of the splicing device in the factory and during shipping and storage of the device. When the occasion arises for affecting the splice, in the field, the rod is removed from the device and the ends of two conductors to be spliced together are inserted into the gripping members of the device. In addition, such a rod means allows a reduction in the cross-section of 92 and 93 of the tube 88, which hold the springs in compression, such that less shearing force is needed to effect release of the springs. And lastly, the rod and nut assembly serves as a means to insert the completed subassembly into housing 12 for factory assembly.

While the invention has been described in terms of certain embodiments, the claims appended hereto are intended to encompass all embodiments which fall within the spirit of the invention.

What is claimed is:

1. An assembly for making a mechanical and/or electrical connection between two conductors and the like, comprising:
    a tubular housing having tapered portions converging toward open outer ends of the housing,
    unitary, tubular, conductor gripping structures located within said housing, the wall of each structure having an outer tapered surface converging toward the open outer end of the housing, and thin wall portions that form a continuous hoop of material at least adjacent the ends of the structure,
    hammers of substantial mass located within the housing, and spaced a predetermined distance from the conductor gripping structure,
    at least one coil spring made of relatively large gauge spring material located between and in engagement with the hammers,
    rod means extending between and in engagement with the hammers for holding the hammers against the spring and the spring in compression, and
    means for releasing the rod such that the hammers and the compression of the spring are released, the hammers and released compression of the spring being effective to drive the hammers the predetermined distance to the conductor gripping structures, and the gripping structures toward the open end of the housing, the tapered portion of the housing being effective to reduce the diameter of the structures by folding the thin wall portions thereof.

2. The assembly of claim 1 in which the unitary conductor gripping structures are provided with relatively thin wall portions that extend along the length of the structures to allow the structures to collapse in a substantially uniform manner when they are driven toward the open end of the tapered housing.

3. The assembly of claim 1 in which the unitary conductor gripping structures are provided with thin wall portions adjacent both ends thereof, and a slotted, open area extending between the wall portions, the open area and thin wall portions providing uniform collapse along the length of the structures.

4. The assembly of claim 1 in which at least one of the hammers and an associated end of the rod means are threaded together, the compression of the coil spring being released when the threaded hammer and rod end are relatively rotated in a manner that disengages the hammer and the end of the rod.

5. The assembly of claim 1 in which the material of the rod is relatively soft, and means capable of cutting through the rod being located between the hammers and adjacent the rod.

6. The assembly of claim 1 in which the rod means is provided with a head portion at one end, said head portion serving to engage one of the hammers in holding the coil spring in compression, and an opening provided in the one hammer, said opening having a size and configuration that will permit the head portion to travel through the opening when the hammer and opening are relatively rotated to position the head portion and opening in alignment with each other.

* * * * *